B. C. ROCKWELL.
Harvester-Cutters.

No. 154,192. Patented Aug. 18, 1874.

Witnesses:
Samuel J. Parker
Ira C. Rockwell

B. C. Rockwell.
Inventor.

UNITED STATES PATENT OFFICE.

BENJAMIN C. ROCKWELL, OF NEWFIELD, NEW YORK.

IMPROVEMENT IN HARVESTER-CUTTERS.

Specification forming part of Letters Patent No. 154,192, dated August 18, 1874; application filed June 29, 1874.

*To all whom it may concern:*

Be it known that I, BENJAMIN C. ROCKWELL, of Newfield, Tompkins county, New York, have invented an Improved Finger-Guard for Mowers and Reapers, of which the following is a specification:

My object is to render more efficient the cutters of harvesters; and I first place between the teeth or ordinary fingers supplementary fingers, projecting from the cutter-bar, about half as long as the usual fingers, and make them flatter than usual, and with no projection above the cutter; and, second, I arrange on the upper fender-piece, over the cutters, gibs or guide-pieces for the purpose of holding the forward end of the cutters down to the lower part of the fingers. These gibs or guide-pieces I make as long as desirable, preferably short, as is represented, and to hold each cutter by itself; or longer, or even arrange a wrought-iron bar the whole length of the cutter-bar, so as to hold all the ends of the cutters down simultaneously; and I arrange the whole as will be apparent as I describe my improvements.

Figure 1:
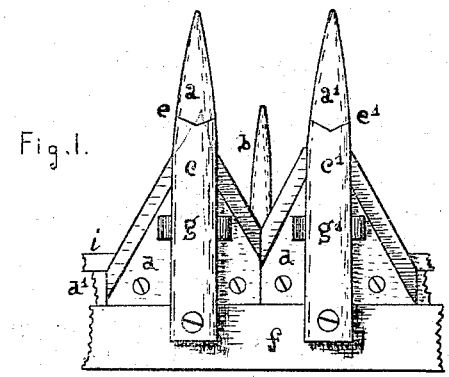
Figure 2:
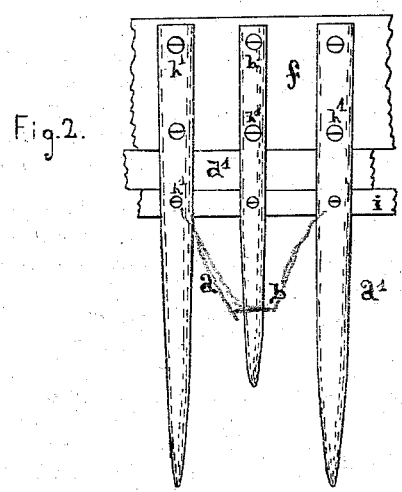
Figure 3:
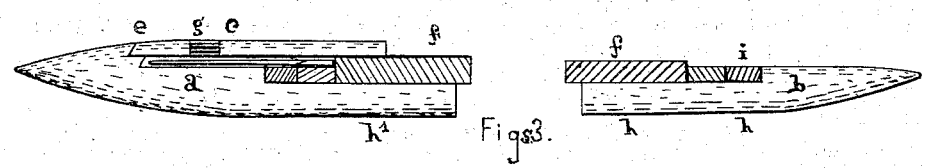

Figure 1 is a view looking down on two fingers of the finger-bar with my improvements attached. Fig. 2 is a view of the same inverted, or of the under side. Figs. 3 are views of the improved fingers, and also of my intermediate finger.

In Fig. 1, $a\ a'$ are two of the fingers of the finger-bar, and $b$ is my intermediate or additional finger; and $c\ c'$ are the two double dovetailed upper or guard pieces over the knives or cutters $d\ d$, which pieces $c\ c'$ are double dovetailed at their forward part at $e\ e'$ to the fingers, and fast at their rearward part to the finger-bar $f$. The ends of the fingers and their under side receive the force of stones and other obstacles encountered in mowing and reaping, and hence these pieces $c$ act as braces to resist the thrust or force backward, and they aid in the cutting of the grass or grain, and are of such length as to be readily adjustable to the cutter-blades and fingers.

The intermediate fingers $b$ serve the useful purposes of preventing stones, sticks, pieces of bone, wood, and other articles from coming directly into the hollow or angle between two cutter-blades, and thus dulling both; and if the obstacle is large they prevent its touching the cutter knives or blades at all, and they divide the spaces between the fingers into lesser spaces, and thus more grass is cut to the acre and more easily, as well as give double the rest against which the knives or blades cut. At $g\ g'$ are gibs or enlargements, projecting each side out from the pieces $c\ c'$, and they are for the purpose of making the knives cut closer to the under portion of the fingers, and for making bearing on the central portions of the knives or cutter-blades, and in this manner prevent any too loose play of the knives in the fingers.

In Fig. 2 the under-side fastening of the fingers is seen, indicated by the same letters. My intermediate fingers are fastened to the finger-bar $f$ by the screws $h$, as are the fingers $a$ by the screws $h'$. The rest of the various parts are apparent, so far as they can be seen in the figure.

In Figs. 3 are seen both the fingers $a$, with pieces $c$, gibs $g$, and finger-bar and knives or cutter-blades, and the perpendicular dovetailing at $e$, the horizontal dovetailing being seen at $e'$, Fig. 1, and also the side view of the intermediate finger $b$, fast to the finger-bar $f$ and to the bar $i$.

The advantages and uses of my invention are apparent to those skilled in the art to which it appertains.

I claim—

The plate or parts $c$ and gibs $g$, intermediate fingers $b$, and fingers $a$, combined with the bars $f$ and $i$, for the cutters $d$ and cutter-bar $d'$, as set forth.

BENJAMIN C. ROCKWELL.

Witnesses:
SAMUEL J. PARKER,
IRA C. ROCKWELL.